United States Patent [19]

Adamson

[11] 4,427,306
[45] Jan. 24, 1984

[54] RADIOMETER APPARATUS FOR AIR DISTURBANCE DETECTION

[75] Inventor: Hugh P. Adamson, Golden, Colo.

[73] Assignee: University Patents, Inc., Norwalk, Conn.

[21] Appl. No.: 175,117

[22] Filed: Aug. 4, 1980

[51] Int. Cl.³ .............................................. G01J 5/08
[52] U.S. Cl. .................................. 374/128; 73/170 R; 250/338; 343/351
[58] Field of Search ............... 250/339, 342, 338, 340; 73/170 R, 355 R; 343/100 ME

[56] References Cited

U.S. PATENT DOCUMENTS

| | | | |
|---|---|---|---|
| 3,359,557 | 12/1967 | Fow et al. | 73/170 R X |
| 3,380,055 | 4/1968 | Fow et al. | 73/355 R |
| 3,475,963 | 11/1969 | Astheimer | 73/355 R |
| 3,696,670 | 10/1972 | Collis | 250/338 X |
| 3,914,610 | 10/1975 | Bigbie | 250/352 X |
| 3,935,460 | 1/1976 | Flint | 250/349 |
| 4,023,201 | 5/1977 | Faulkner | 73/355 R X |
| 4,178,100 | 12/1979 | Frosch et al. | 73/355 R X |
| 4,215,275 | 7/1980 | Wickersheim | 73/355 R X |
| 4,233,512 | 11/1980 | Rupert | 73/355 R X |
| 4,266,130 | 5/1981 | Kuhn | 250/339 |
| 4,296,318 | 10/1981 | Mezzetti et al. | 73/355 R X |
| 4,313,344 | 2/1982 | Brogardh et al. | 73/355 R X |

OTHER PUBLICATIONS

Publ. "Pyroelectric PVF$_2$ Infrared Detector Arrays", by U. Kom et al., Applied Optics/vol. 20, No. 11, Jun. 1, 1981, pp. 1980-1982.
Publ. Report on "Aviation Safety Technology. In Flight Detection and Production of Clear Air Turbulance", 12/1/79, P. M. Kuhn et al., (NASA) Chapters 5, et seq.

Primary Examiner—Daniel M. Yasich
Attorney, Agent, or Firm—O'Rourke & Harris

[57] ABSTRACT

A radiometer apparatus is described that is particularly useful for detecting clear air turbulence by sensing infrared radiation. The radiometer includes optics for directing infrared radiation past a chopper, lens and infrared filter assembly to a radiation sensor which produces an analog output signal that is routed through an N-path filter unit and then demodulated and integrated by an averaging integrator to produce temperature indicative differences for determination of the presence of clear air turbulence in the area then being examined by the apparatus, the N-path unit and averaging intergrator providing a high signal to noise ratio. An automatic calibration unit is also provided to provide stability and reliability to the apparatus.

4 Claims, 13 Drawing Figures

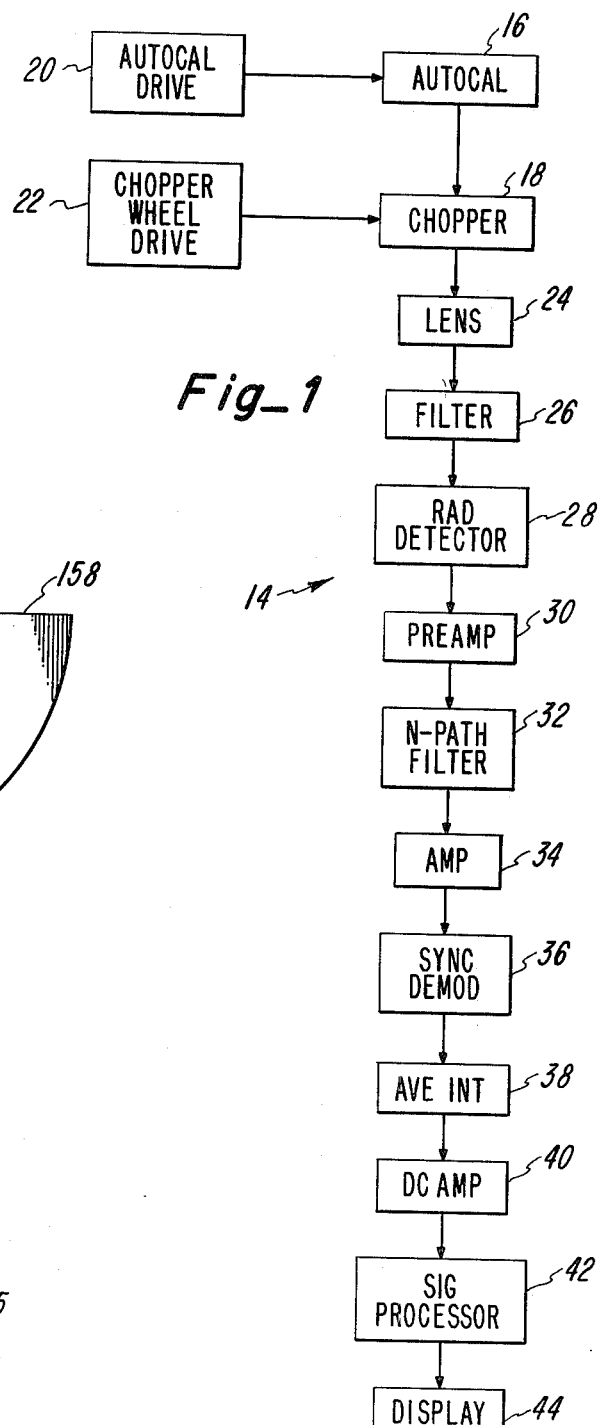
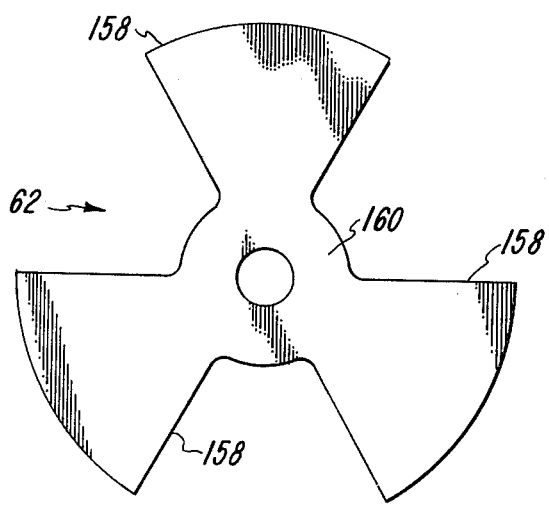
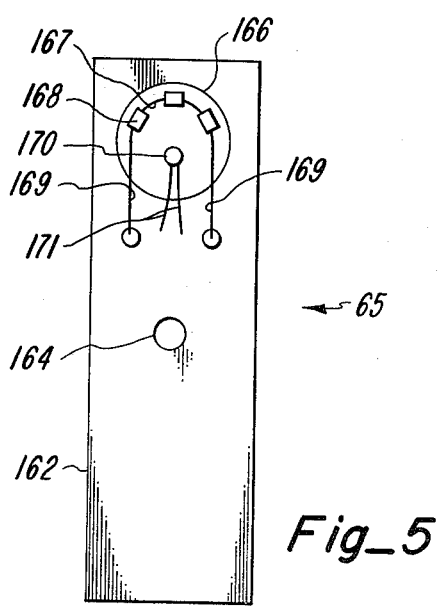
Fig_1
Fig_4
Fig_5

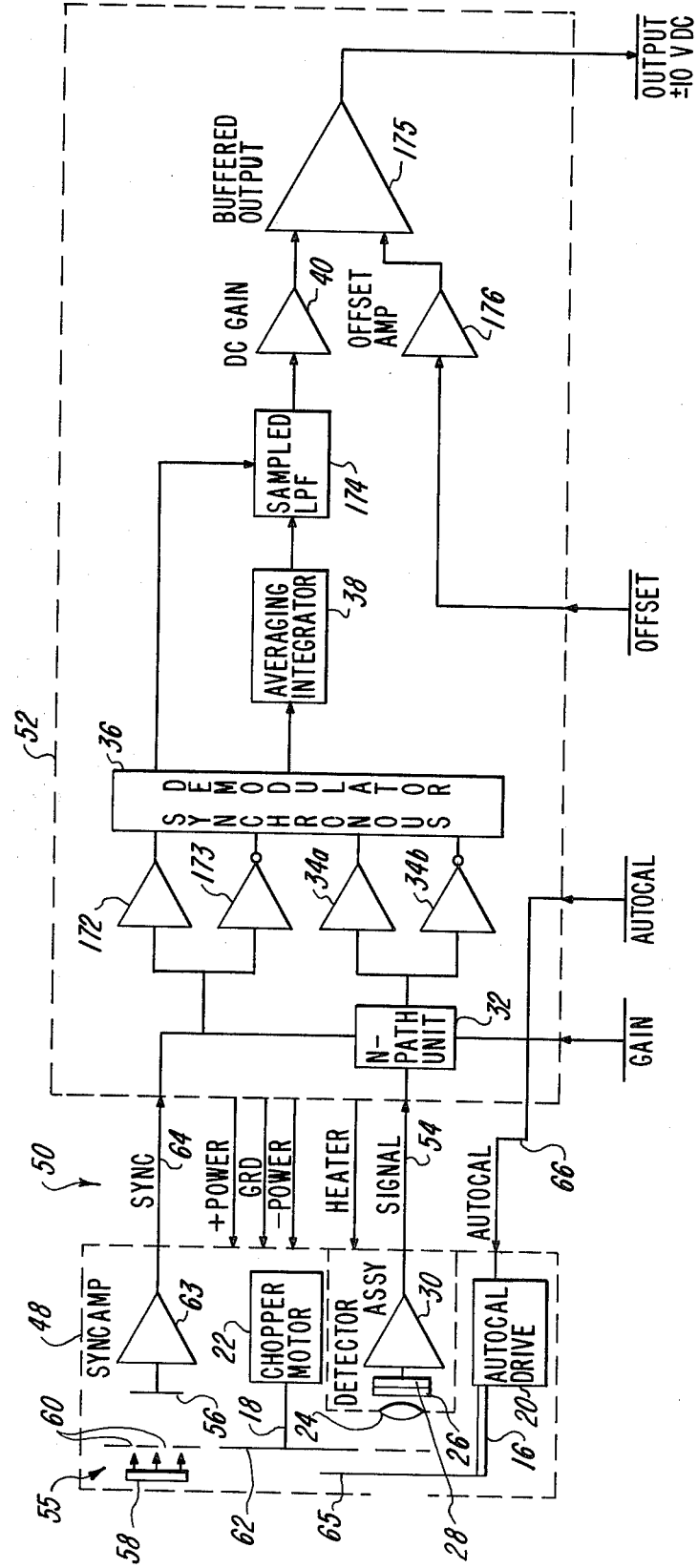
Fig_2

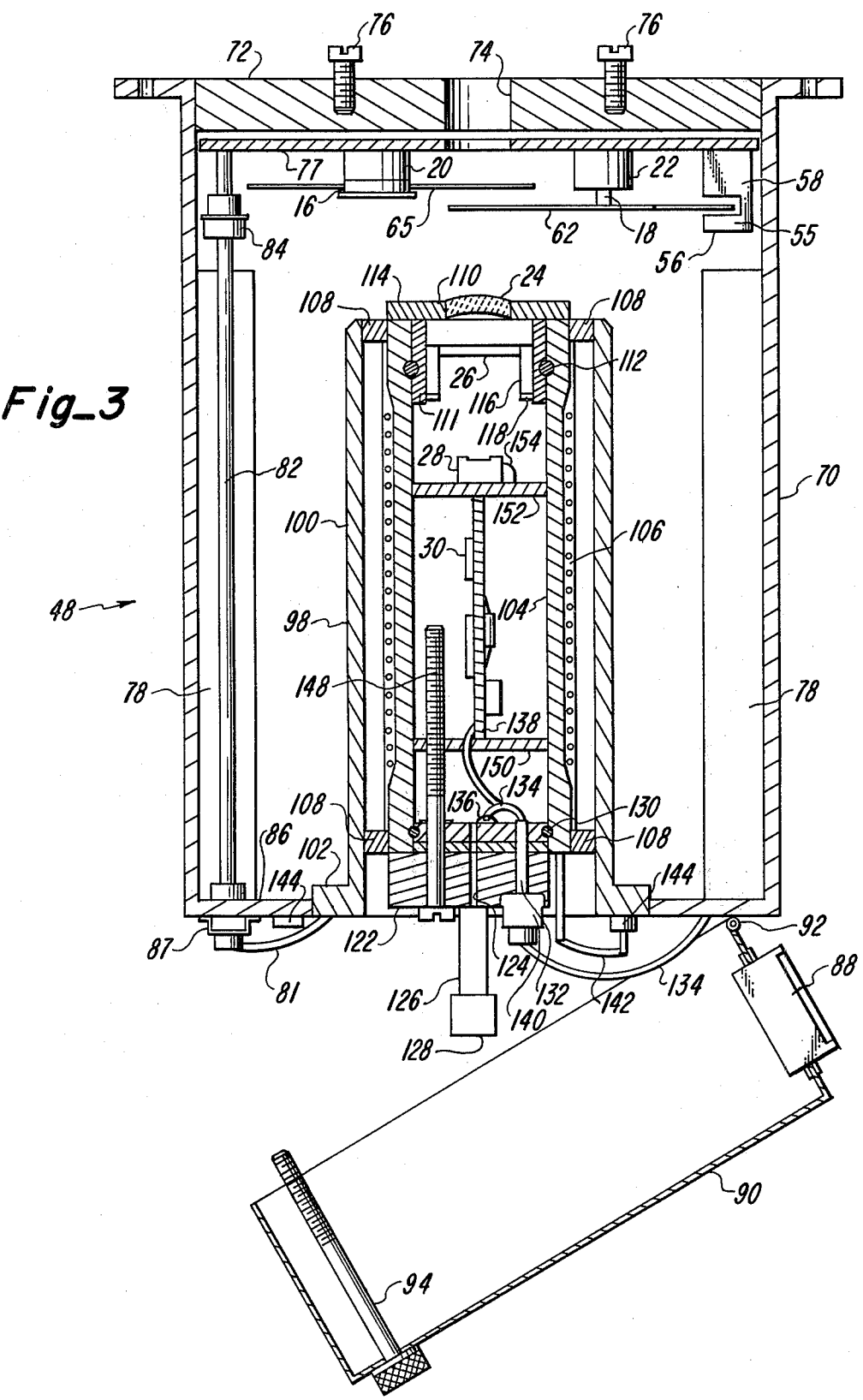
Fig_3

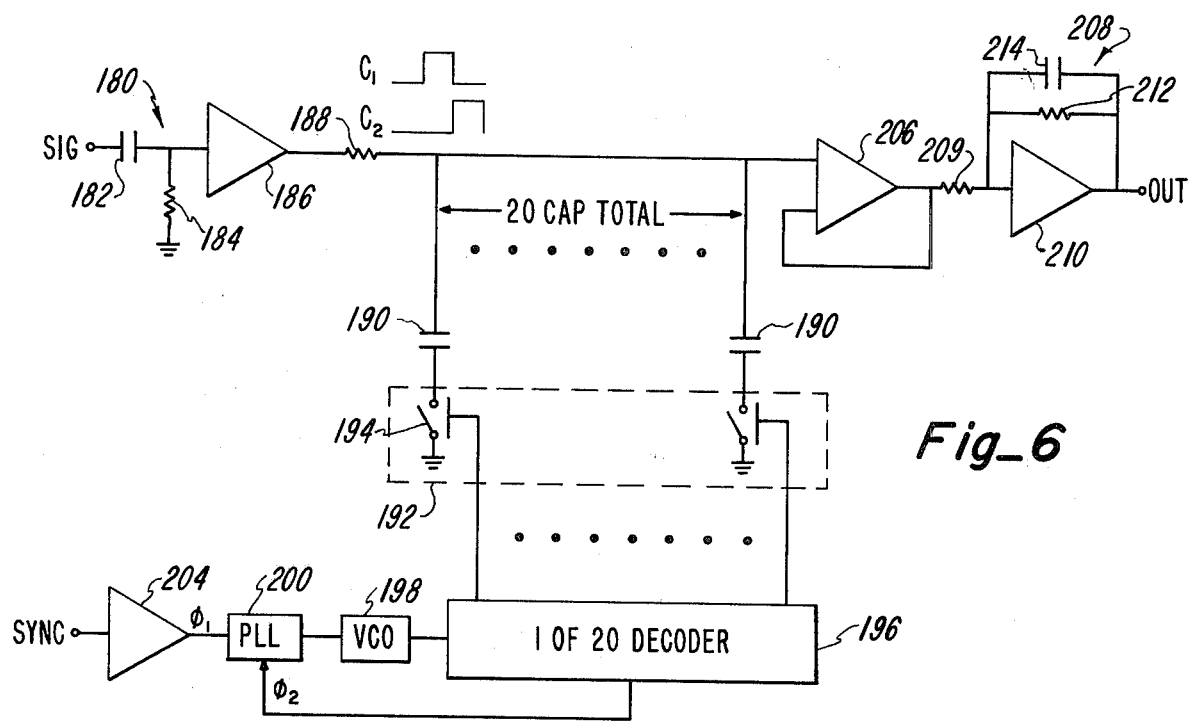
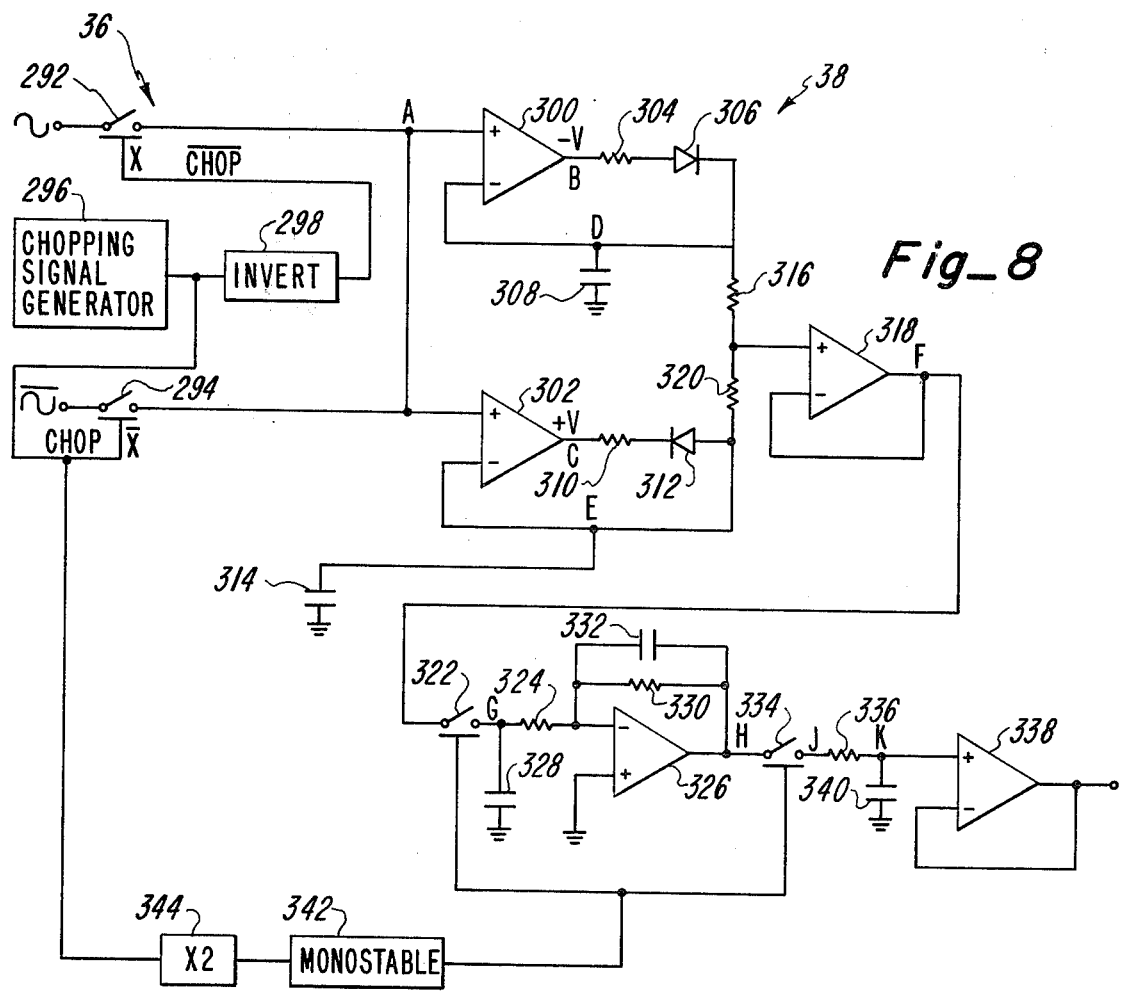
Fig_6
Fig_8

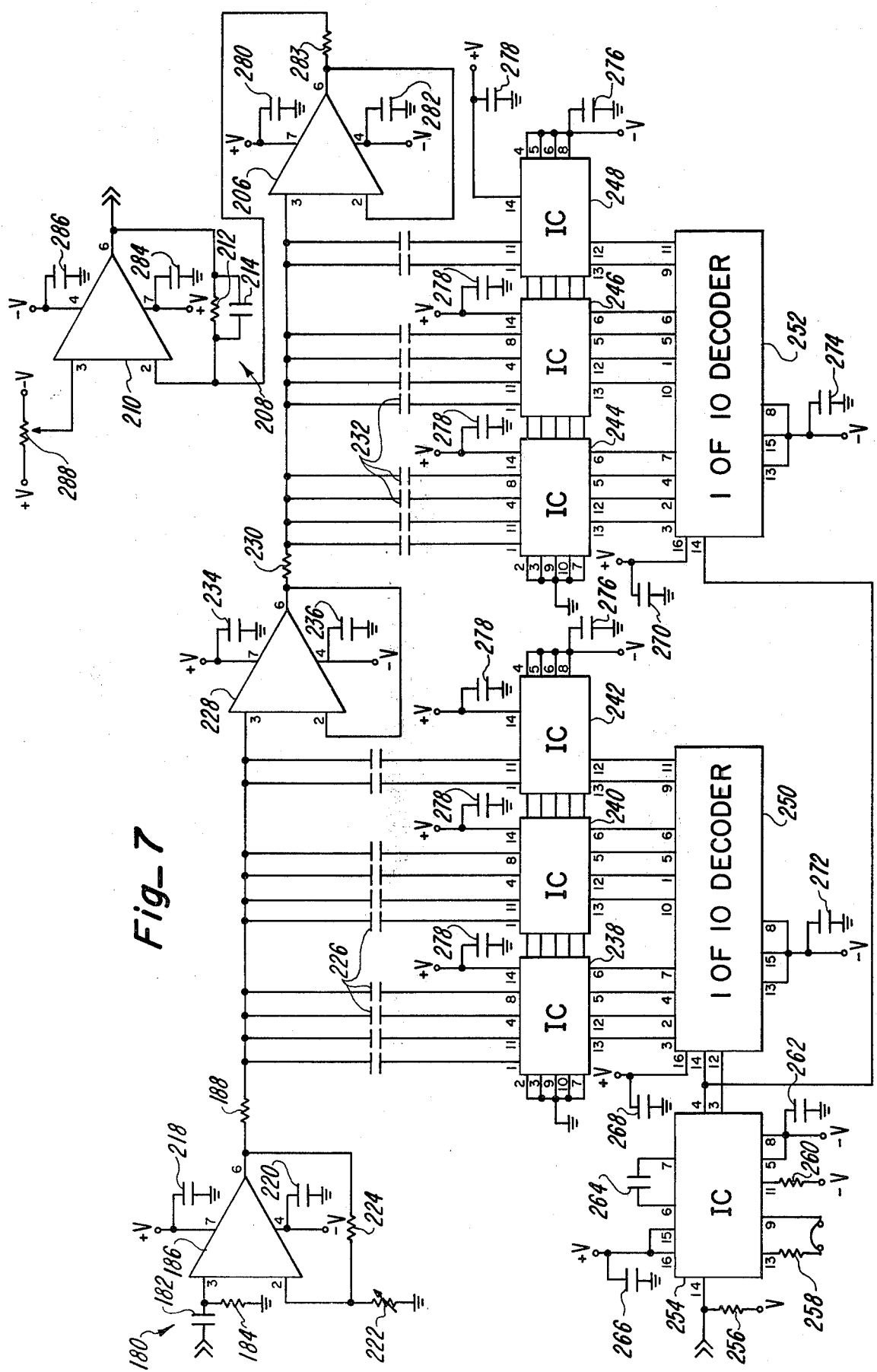
Fig_7

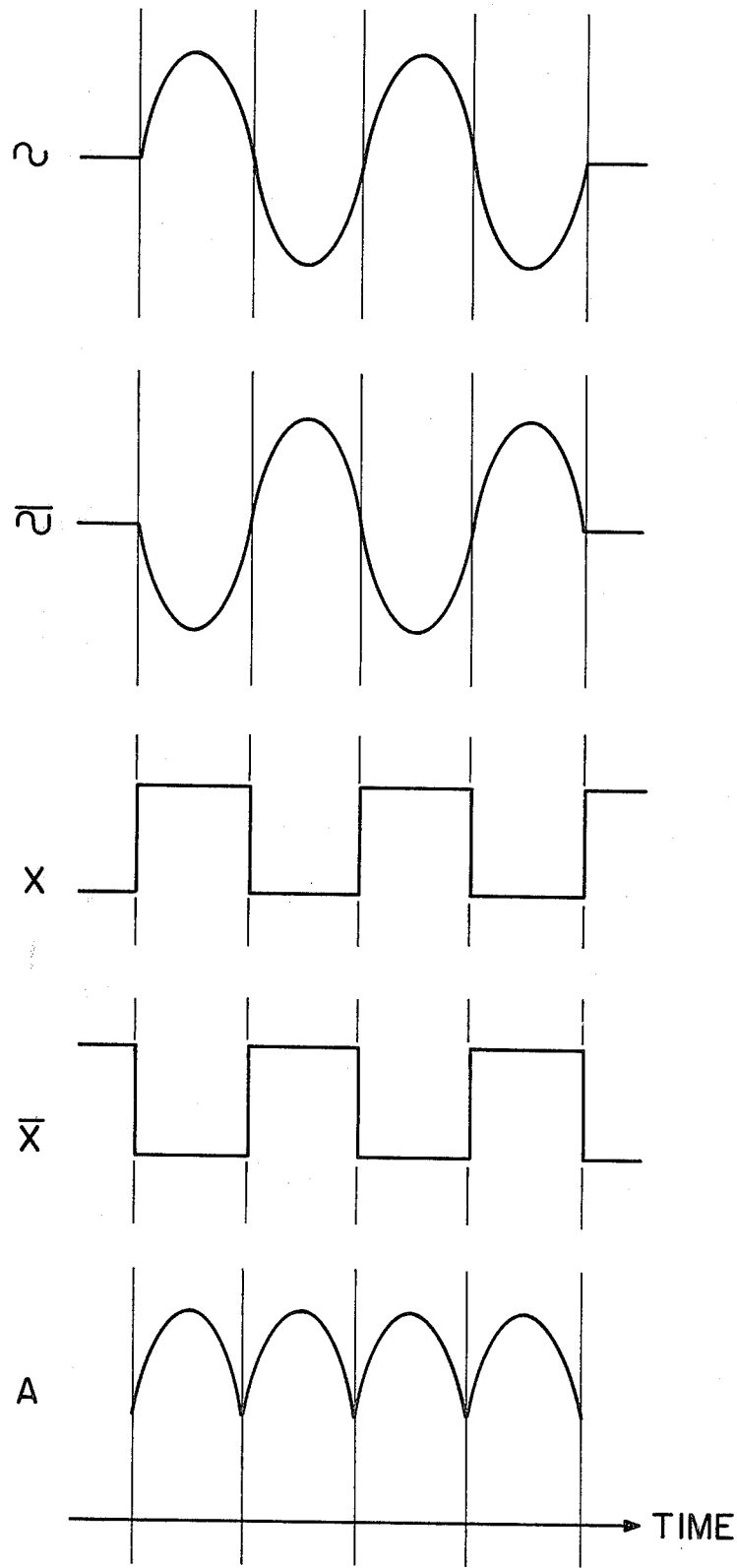
Fig_9

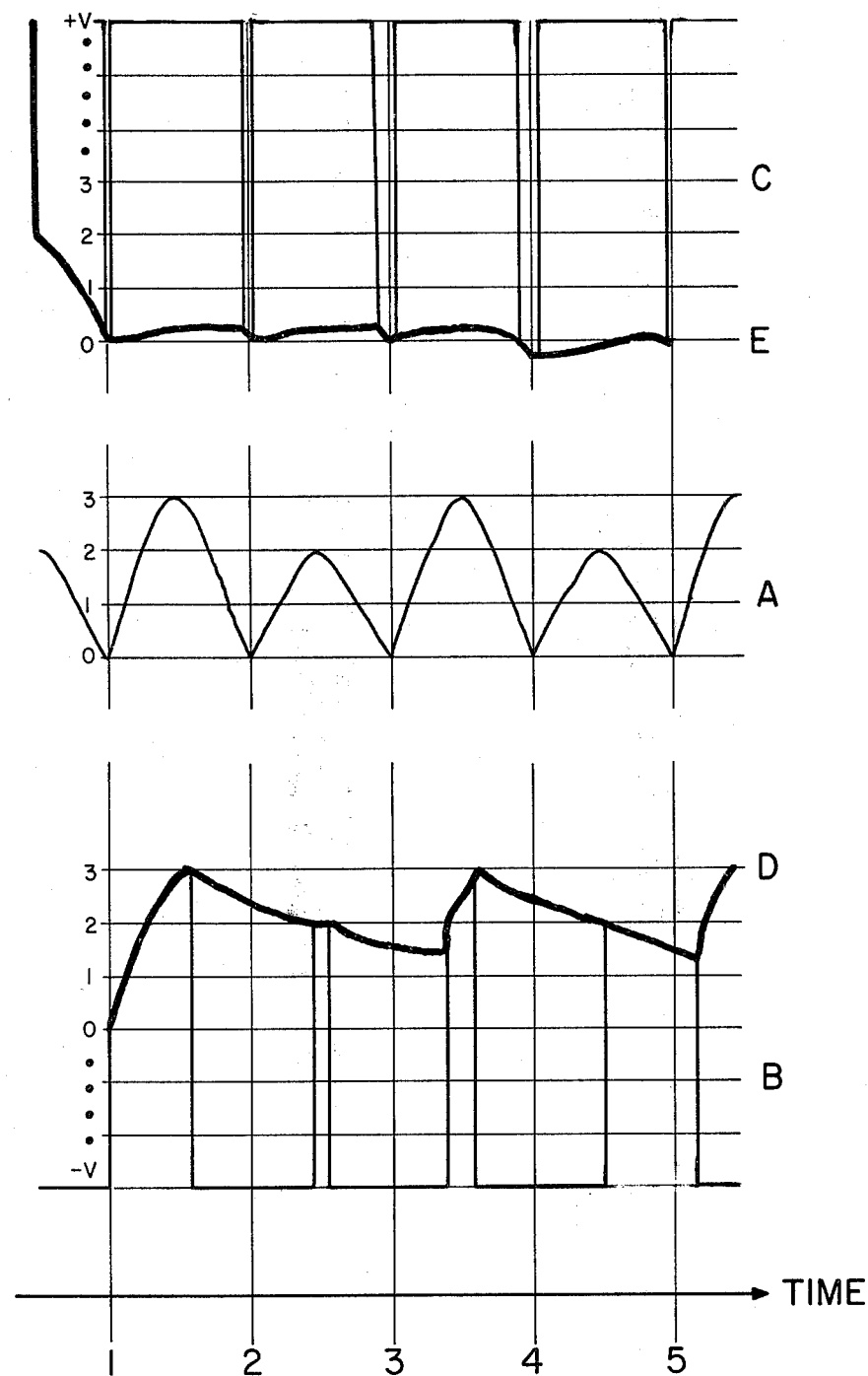
Fig_10

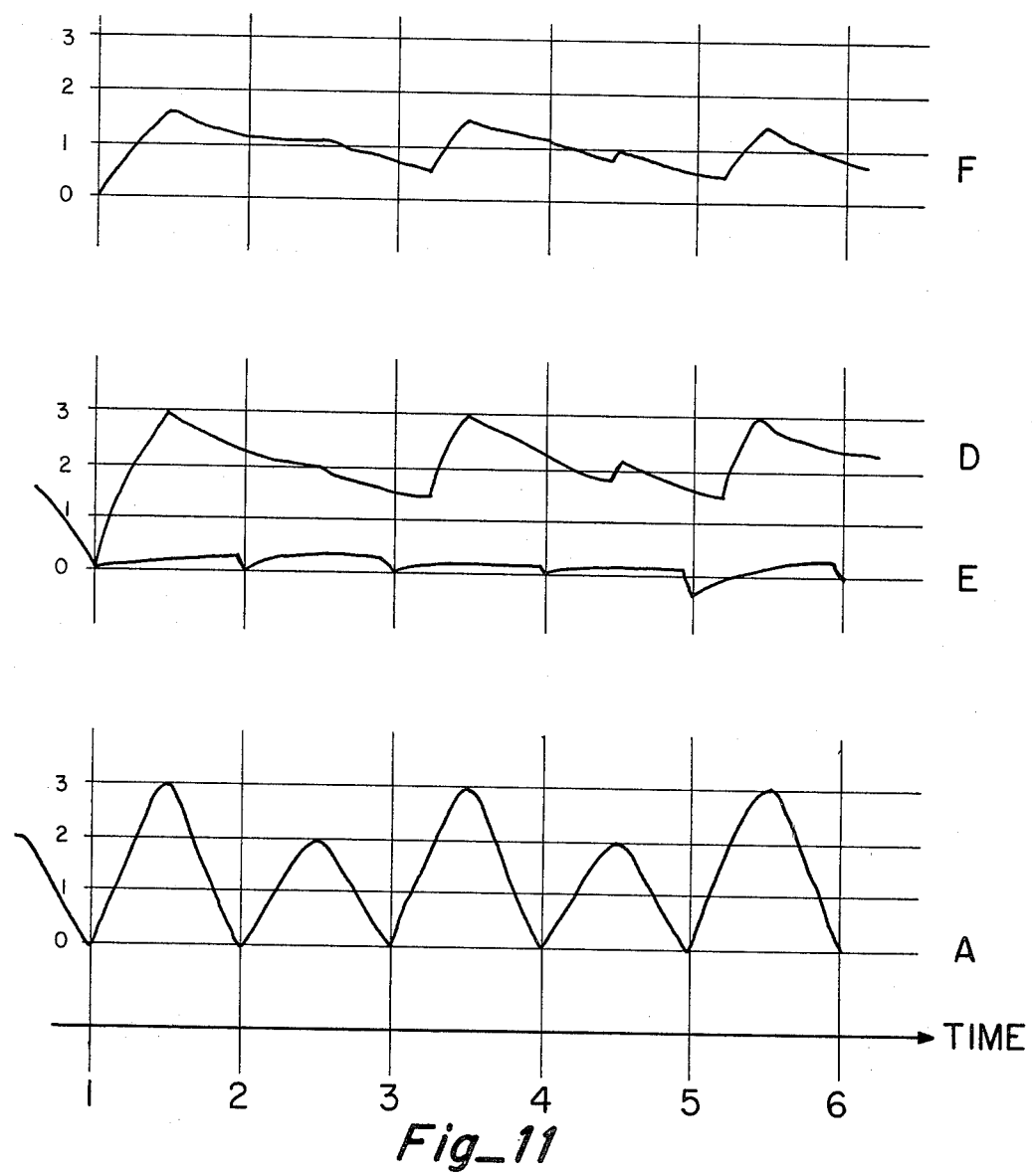
Fig_11
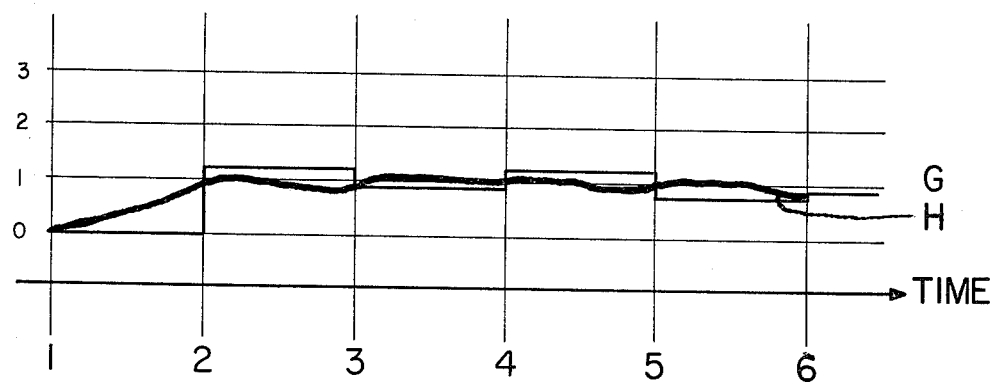
Fig_12

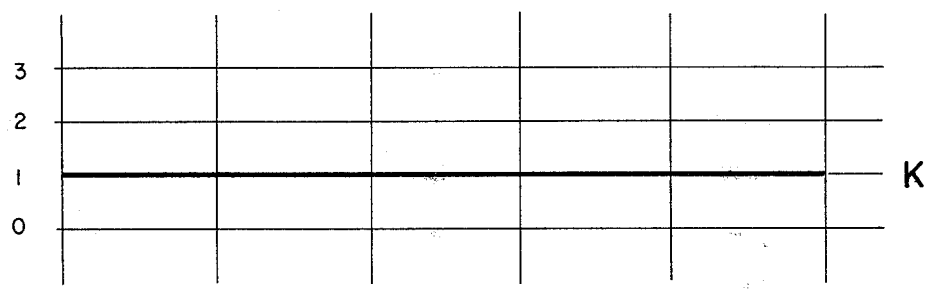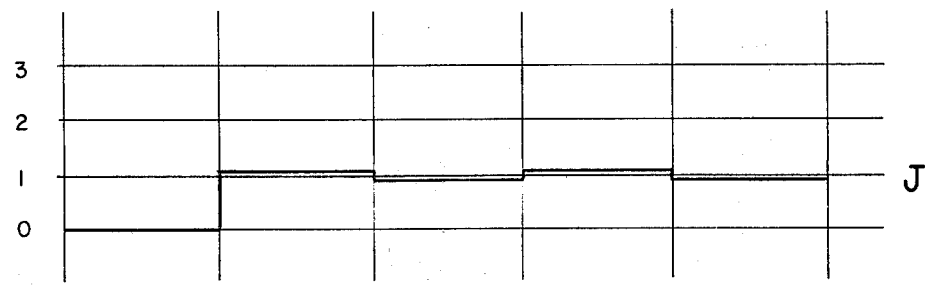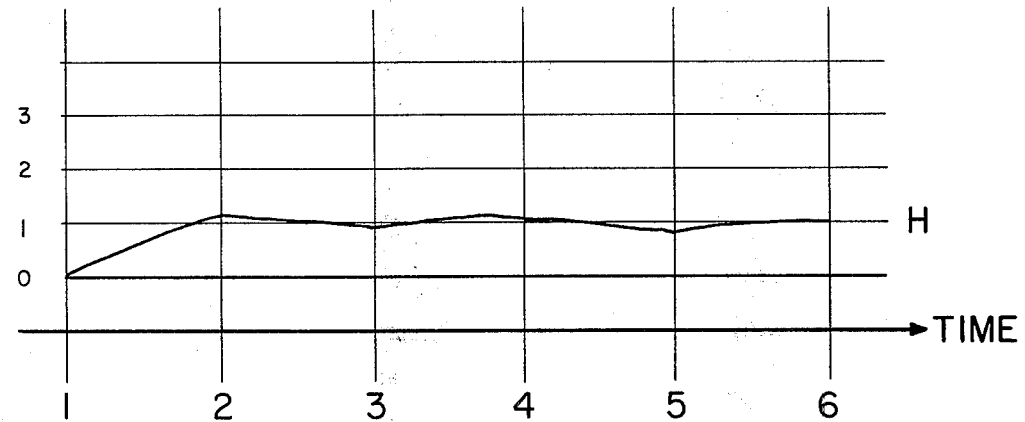
Fig_13

1

RADIOMETER APPARATUS FOR AIR DISTURBANCE DETECTION

FIELD OF THE INVENTION

This invention relates to an improved radiometer apparatus and, more particularly, relates to an improved radiometer that is particularly useful for detecting Clear Air Turbulence (CAT).

BACKGROUND OF THE INVENTION

One of the more perplexing problems encountered by aircraft has been due to air disturbances such as clear air turbulence. Clear air turbulence is encountered at high altitudes and is thought to be due to at least two different conditions one of which is created by a standing wave found in the lee of a mountain barrier which occurs when statically stable air is carried over the mountain and the other of which results from waves formed in statically stable layers in the atmosphere that are subjected to sufficiently strong vertical wind gradients or shears.

It has heretofore been suggested that clear air turbulence can be detected by detecting temperature gradients existing therein. One such system utilizing detection of infrared or microwave energy from the $CO_2$ band of the spectrum by use of a radiometric receiver is set forth by R. W. Astheimer in *Applied Optics*, Vol. 9, pg. 1789 (1970). In addition, a method and system for detecting clear air turbulence is set forth in U.S. Pat. No. 3,696,670. In this patent, it is suggested that detection be based on water vapor anomalies. Such detection is also the basis of the apparatus and method described in U.S. patent application Ser. No. 950,943, filed Oct. 13, 1978, by Peter M. Kuhn and entitled "Improved Method and Apparatus for Detecting Clear Air Turbulences", and now U.S. Pat. No. 4,266,130, issued May 5, 1981. Atmospheric absorption as a function of frequency and distance in infrared applications is discussed in "Infrared Passbands For Clear Air Turbulence Detection" by Kuhn, Nolt, Stearns and Radostitz in *Applied Optics*, Vol. 3, No. 4, October 1978.

While apparatus and methods have been heretofore suggested for detecting clear air turbulence, and improvements to such systems have also been heretofore suggested, further improvements are still deemed needed, particularly in providing a signal with a high signal to noise ratio to reduce the number of erroneous indications of clear air turbulences and/or in maintaining system calibration.

SUMMARY OF THE INVENTION

This invention provides an improved radiometer apparatus that is particularly useful for detection of clear air turbulence. The apparatus utilizes optics to direct infrared radiation to a radiation sensor which develops an analog signal that is routed through an N-path filter unit and demodulated with the demodulated signal then being integrated by an averaging integrator to provide the needed signal indicative of air disturbances, the N-path filter unit and the averaging integrator being utilized to provide a high signal to noise ratio signal. Automatic calibration of the apparatus is also provided for stability and reliability assessment.

It is therefore an object of this invention to provide an improved radiometer apparatus.

It is another object of this invention to provide an improved apparatus useful for detection of clear air turbulence.

It is still another object of this invention to provide an improved apparatus for detection of air disturbances with high reliability and low erroneous indications of such disturbances.

It is still another object of this invention to provide an improved apparatus utilizing optics to direct infrared radiation to a radiation sensor which develops an analog signal that is routed through an N-path filter and demodulated with the demodulated signal then being integrated to provide the desired indication.

It is yet another object of this invention to provide an improved apparatus utilizing an averaging integrator for providing a high signal to noise ratio.

It is still another object of this invention to provide an improved apparatus that is automatically calibrated.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a block diagram illustrating apparatus utilized for detecting clear air turbulence;

FIG. 2 is a block diagram of the radiometer device of this invention useful for detection of clear air turbulence;

FIG. 3 is a cut-away side view with electronic placement indicated of the remote head of the device of this invention utilized for detecting clear air turbulence;

FIG. 4 is a front view of the chopper wheel shown in FIGS. 2 and 3;

FIG. 5 is a front view of the paddle for automatic calibration shown in FIGS. 2 and 3;

FIG. 6 is a simplified schematic diagram of the N-path unit shown in FIG. 2;

FIG. 7 is a more detailed schematic diagram of the N-path unit shown in FIG. 4;

FIG. 8 is a combined block and schematic diagram of the averaging integrator utilized in the apparatus of this invention as shown in FIG. 2;

FIG. 9 is a series of typical waveforms illustrating inputs to the averaging integrator shown in FIG. 8;

FIG. 10 is a series of typical waveforms illustrating signals formed at selected points in the averaging integrator shown in FIG. 8;

FIG. 11 is a series of typical waveforms to be found at the summing amplifier of the averaging integrator shown in FIG. 8;

FIG. 12 are typical waveforms found at the low pass filter of the averaging integrator shown in FIG. 8; and FIG. 13 is a series of typical waveforms at the output of the averaging integrator shown in FIG. 8.

DESCRIPTION OF THE INVENTION

As brought out hereinabove, radiometers are known in the prior art. One of the better know radiometers is the Barnes Model PRT-5 Precision Radiation Thermometer. This unit includes a chopper, lens, filter, detector and preamplifier in a remote sensing head as well as an amplifier, synchronous demodulator and selectable low pass filter in an electronics chassis. In addition, a radiometer or apparatus for detecting clear air turbulence, is also shown and described in now allowed U.S. patent application Ser. No. 950,943, filed Oct. 13, 1979 by Peter M. Kuhn, entitled "Improved Method and Apparatus for Detecting Clear Air Turbulences," which application has now issued as U.S. Pat. No. 4,266,130 and is hereby included by reference.

The embodiment of this invention is particularly useful for clear air turbulence detection but is not limited thereto. The apparatus is similar to both that of the Barnes radiometer, hereinabove referenced, and the apparatus for detecting clear air turbulence as shown in the patent application, hereinabove referenced.

The device of this invention when utilized for detection of clear air turbulence may therefore use a chopper, lens, filter, detector and preamplifier in a remote sensing head in the same manner as does the Barnes radiometer and/or as does the system for detecting clear air turbulence as described in the above-identified patent application. Also, the amplifier, synchronous demodulator and selectable low pass filter in an electronic chassis may likewise be utilized. In addition, for clear air turbulence, a signal processor and display may be utilized as described in the above-identified application in order to determine from the signal developed the presence of clear air turbulence and display an indication thereof. As described, such a display might be, for example, through the use of lights with one light (normally green) to indicate an all clear, a second light (normally yellow) to indicate caution or moderate clear air turbulence, and a third light (normally red) to indicate the presence of detected severe clear air turbulence.

FIG. 1 illustrates use of the radiometer in detection of clear air turbulence. Received infrared radiation from a surveillance area is received by clear air turbulance unit 14 and, more particularly, the radiation is directed past automatic calibration unit 16 to chopper unit 18. As shown, the calibration unit is driven by automatic calibration drive 20 and the chopper unit is driven by chopper drive 22.

The radiation passing through chopper unit 18 is collected by lens 24 and filtered by a 20-20 $\mu$m filter unit 26, after which the filtered radiation is detected at infrared detector 28 and amplified by preamplifier 30. As is well known, the electronic signal developed includes noise. By maintaining the noise low with respect to the signal representative of the sensed radiation (i.e., by improving the signal to noise ratio) better detection of clear air turbulence conditions results. This is accomplished in this invention by conditioning the amplified output from preamplifier 30 through use of N-path filter unit 32, after which the signal is amplified by amplifier 34, sychronously demodulated by sychronous demodulator 36, and then integrated by averaging integrator 38. The integrated output is then amplified by DC amplifier 40, processed by signal processor 42, and utilized to display the condition then being sensed at display 44.

As shown in FIG. 2, the improved radiometer device of this invention includes a remote head 48 (having the components 16 through 30 as shown in FIG. 1 included therein) connected through multiwire cable 50 to electronic chassis 52 (having the components 32 through 40 as shown in FIG. 1 included therein). As shown in FIG. 2, remote head 48 thus includes optics, or lens, 24 for receiving infrared radiation from a surveillance area with the radiation received through optics 24 being filtered by filter 26, detected by pyrodetector 28, and developed into an electronic signal indicative of temperature gradients, after which the detected signal is amplified by amplifier 30 and coupled through signal lead 54 of cable 50 to electronic chassis 52.

As shown in FIG. 2, remote head 48 also includes a sync detection unit 55 having a phototransistor 56 which receives light from an LED 58 through apertures 60 in chopper wheel 62 rotatably driven in conventional manner by chopper wheel motor 22. The output from phototransistor 56 is amplified by sync amplifier 63 and provides sync output signal on lead 64 of cable 50 to electronic chassis 52.

Automatic calibration unit 16 includes essentially, as shown in FIG. 2, a constant temperature paddle 65 which is rotated into and out of the path of received infrared radiation by means of automatic calibration drive motor 20. Paddle 16 blocks incoming radiation when calibrating and generates a constant amount of infrared radiation for calibrating the instrument, at typically 42° C. Automatic calibration drive 20 is controlled by an input signal on lead 66 of cable 50.

Remote head 48 is shown in greater detail in FIG. 3. As shown, head 48 includes a cylindrical casing 70 having a front plate 72 with a central aperture 74 and removable screws 76 for facilitating removal of the front plate when desired. Automatic calibration unit 16, chopper unit 18, driver units 20 and 22, and sync detection unit 55 are mounted on printed circuit board 77 at front face 72.

Cylindrical casing 70 has insulation 78 adjacent to the outer metalic wall and power is coupled to printed circuit board 77 at front plate 72 through a cable 81 extending along rod 82 and floating connection 84. Rod 82 (a pair of spaced rods may be utilized if desired) is connected to back plate 86 by connection 87 so that the cable extends thereat from the connector 87 to a head connector 88 attached to back cover 90 which is hinged at one side by hinge 92 and has a cover lock 94 at the other side to hold the cover in the closed position.

Back plate 86 has a subassembly 98 mounted therein so that the subassembly extends into the cavity formed by cylindrical casing 70. Subassembly 98 includes a cylindrical housing 100 having a outwardly extending mounting lip 102 at one end while the other end is open.

A tube, or sleeve, 104 having an insulator 106 wound about the sleeve is inserted into housing 100 and supported by polyurethane rings 108 at both ends.

Lens 24 is mounted in lens support cap 110 which includes a cylindrical wall portion 111 that is received within sleeve 104 with a seal being formed therebetween by O ring 112. As shown, wall portion 111 has a lip 114 in which lens 24 is mounted.

Filter 26 is an infrared bandpass filter, typically 20 to 40 $\mu$m, and is mounted behind lens 24 by means of a filter mount tube 116 secured by a truarc ring 118.

End cap 122 is received on the back end of sleeve 104 so as to be adjacent to back plate 86. End cap 122 has a passage 124 therein communicating with passage port 126 having a valve 128 for controlling the gas composition within sleeve 104. Sealing of the chamber is provided by O ring 130. End cap 122 also has a passage 132 to allow entrance of cable 134 within the cavity and more particularly to be connected within the cavity to thermistor overheat sensor 136 and to printed circuit board 138 of preamplifier assembly 30. Cable 134 extends outwardly from passage 132 to preamp connector 140, and from preamp connector 140 to head connector 88. As also shown in FIG. 3, sleeve 104 has heating leads 142 extending therefrom to heater connector 144, and then from heater connector 144 to head connector 88. Sleeve 104, by being heat controlled, allows the sleeve to be used as a heat reference cavity (Kelvin-Helmholtz) for the radiometer.

A focus adjust screw 148 extends through end cap 122 and is threaded into mounting ring 150 of preamp assembly 30. Assembly 30 has a second mounting ring 152 with printed circuit board 138 extending therebetween. Detector 28 is mounted on the end of printed circuit board 138 outside mounting ring 152 and hence adjacent to filter 26 to receive infrared radiation therefrom. By rotating screw 148, the preamp assembly is moved longitudinally within sleeve 104 to vary the distance of the detector from the filter for focusing purposes. As can be appreciated, since screw 148 is externally accessible, focusing can be achieved as desired after assembly is completed. Control thermistor 154 is positioned adjacent to detector 28 and controls the temperature of the reference cavity.

Chopper wheel 62 is shown in FIG. 4 to preferably include a plurality of arms 158 spaced about a hub 160. By continuous rotation of the chopper wheel, the incoming infrared radiation is periodically interrupted as is well known in the art. It might also be noted that chopper wheel 62 provides interruptions for the sync signal.

Paddle 65 of automatic calibration unit 16 is essentially a single arm 162 as shown in FIG. 5. Arm 162 is rotated in opposite directions about a predetermined arc of about 90 degrees about hub 164 so that in one position it is out of the path of incoming infrared radiation and in the other position interrupts passage of infrared radiation to lens 124. As shown in FIG. 5, target area 166 (i.e., the area brought into the path of infrared radiation to lens 24 when the arm is rotated to intercept the incoming radiation) is a black thermally conductive epoxy which when heated radiates a constant infrared flux. For heating, target area 166 has thereon an electric heater 167 consisting of carbon resistors 168 connected with a power supply through leads 169. The heater is controlled by a control thermistor 170 (having leads 171 therefrom) also located at the target area. The target area in this invention maintains a constant temperature to thus provide a controlled infrared flux to the detector lens during calibration (i.e., when the area 162 is rotated to blank, or interrupt, incoming infrared radiation).

Referring again to FIG. 2, the signal from detector assembly 30 is coupled through signal lead 54 to N-path filter unit 32, the output of which is coupled to amplifiers 34a and 34b the output of each of which is coupled to synchronous demodulator 36. As shown in FIG. 2, the sync input on lead 64 is coupled to N-path filter unit 32 and through amplifiers 172 and 173 to synchronous demodulator 36. The output of synchronous demodulator 36 is coupled to averaging integrator 38, the output of which is coupled to sampled low pass filter 174 which also receives a sync input through synchronous demodulator 36. The output from the sampled low pass filter is coupled through DC amplifier 40 to buffer amplifiers 175 which supplies the output to signal processor 42. As also shown in FIG. 2, buffer amplifier 175 receives an offset input through offset amplifier 176.

A simplified electronic schematic of the N-path filter unit is shown in FIG. 6. As shown, the signal from preamplifier 30 is coupled through high pass filter 180, (consisting of capacitor 182 and resistor 184) to buffer 186. The output from buffer 186 is coupled through resistor 188 to a common junction with one side of N capacitors 190 (N equals 20 as shown in FIG. 6 by way of example). Capacitors 190 are connected at their other side with switching unit 192 having a separate switch 194 for each capacitor.

Each switch 194 is connected to times N decoder 196 (a one of twenty decoder in the embodiment shown in FIG. 6) provide separate outputs to control each switch 194 (i.e., there are 20 output lines when N equals 20). Each line is synchronously decoded at N times the frequency of interest. This is accomplished through use of a phase locked loop voltage controlled oscillator with decoder 196 included in the loop. As shown in FIG. 6, voltage controlled oscillator (VCO) 198 provides an input to decoder 196, and phase locked loop 200 provides an input to control the frequency of voltage controlled oscillator 198. Decoder 196 provides feedback ($\div N$) (i.e., $\div 20$ as shown in FIG. 6) to phase locked loop 200 so that the desired frequency $Q_2$ is equal to the reference frequency $Q_1$ coupled to phase locked loop 200 by a sync input coupled through buffer 204. This causes the voltage controlled oscillator 198 to be frequency stabilized at a frequency N times the sync frequency.

The one of twenty decoder causes each capacitor 190 to be successively connected in the circuit so that each is charged to a level dependent upon the level of the AC signal coupled through resistor 188 at the precise time that the switch 194 controlling that particular capacitor is closed to place the capacitor in circuit. Each switch 194 is closed for the sync period/N seconds. This results in each switch being closed once during each sync cycle. Therefore, the charge on each capacitor will vary depending upon the signal each received when the associated switch is closed during the cycle.

At the junction of capacitors 190 and resistor 188, the signal will appear as a step function of the original signal. This signal is then coupled through buffer 206 to low pass filter 208 which consists of resistor 209 and amplifier 210 having parallel connected feedback resistor 212 and capacitor 214 connected to the junction of resistor 209 and amplifier 210. The frequency of the low pass filter 208 is selected to be equal to the sync frequency.

The purpose of the N-path filter is to lower the theoretical limit (noise equivalent power) of the detected signal. The equation for the theoretical limit of performance for thermal detectors is $$\overline{\Delta\phi^2} = 4KT_d^2\tau\Delta f$$

where:
  K = Boltzmann's constant
  $\Delta f$ = the theoretical frequency bandwidth
  $T_d$ = the temperature of the reference element
  $\tau$ = the thermal conductance between the responding element and its surroundings.

Since the theoretical limit is a linear function of the electrical bandwidth then it follows that the smaller the electrical bandwidth is the smaller the theoretical limit will be. The N-path filter allows $\Delta f$ to be substantially reduced in this invention. A discussion of theoretical limits of performance for thermal detectors is found in Infrared Handbook, Wolfe et al, Office of Naval Research, Department of the Navy, Arlington, Va., Chapter 11.2.5 (1978). In addition, a more detailed discussion of N-path filters may be found in Analog Switches And Their Applications by Siliconix Incorporated, Chapter 5 (1976).

A more detailed electronic schematic of the N-path filter is shown in FIG. 7. As shown, the input signal is coupled through filter 180, consisting of capacitor 182 (3 $\mu$F) and resistor 184 (1 M) to buffer 186 (LF356). Buffer 186 has pin 7 connected with a plus voltage power supply and with ground through capacitor 218 (0.1 $\mu$F), pin 4 is connected to the negative voltage power supply and with ground through capacitor 220 (0.1 $\mu$F), and the gain of the amplifier is adjusted by poteniometer 222 (0-20K) connected with pin 2 and to feedback resistor 224 (20K).

The output from the buffer is coupled through resistor 188 (5 M) to the common junction of capacitors 226 (0.1 $\mu$F), which capacitors are equal to N/2 of the total number of capacitors so that when N=20, as shown in the embodiment of FIG. 7, 10 capacitors are utilized and designated by the general numeral 226. The junction of capacitors 226 is connected with the input to buffer 228 (LF356) the output of which is coupled through resistor 230 (5 M) to the common junction of capacitors 232 (0.1 $\mu$F) which constitute the second half of N/2 of the total number of capacitors (which would be 10 capacitors as shown in the embodiment of FIG. 7). Pin 7 of buffer amplifier 228 is connected with the positive voltage power source (+8 volts) and with ground through capacitor 234 (0.1 $\mu$F), while pin 4 is connected to the negative voltage power supply (−8 volts) and with ground through capacitor 236 (0.1 $\mu$F).

Switches 238, 240, 242, 244, 246 and 248 (4066) together form switching unit 192 (as identified in FIG. 6) and are connected to the other side of capacitors 226 and 232 as shown in FIG. 7. 1 of 10 decoders 250 and 252 (4017) together form a 1 of 20 decoder (as indicated in FIG. 6). Integrated circuit 254 (4046) provides buffer 204, phase locked loop 200 and voltage controlled oscillator 198 (as shown in FIG. 6). As shown in FIG. 7, the sync input pin 14 of integrated circuit 254 has a resistor 256 (100K) to the negative voltage power supply, pin 13 is connected to pin 9 through resistor 258 (100K), pin 11 is connected with the negative voltage power supply through resistor 260 (1 M), pins 5 and 8 are connected to the negative voltage power supply and with ground through capacitor 262 (0.1 $\mu$F), pins 6 and 7 are connected through capacitor 264 (0.01 $\mu$F), and pins 15 and 16 are connected with the positive voltage power supply and with ground through capacitor 266 (0.1 $\mu$F).

Pin 16 of integrated circuits 250 and 252 are connected to the positive voltage power supply and with ground through capacitors 268 and 270 (0.1 $\mu$F), respectively, while pins 8, 13 and 15 are connected with the negative voltage power supply with ground through capacitors 272 and 274 (0.1 $\mu$F), respectively. Pins 4, 5, 6 and 8 of integrated circuits 242 and 248 are connected with the negative voltage power supply and with ground through capacitors generally designated by the numeral 276 (0.1$\mu$F), pins 2, 3, 9, 10 and 7 of integrated circuits 238-248 are connected with ground, and pins 14 are connected to the positive voltage power supply and with ground through capacitors generally designated by the numeral 278 (0.1 $\mu$F).

The junction of capacitors 232 and resistor 230 is connected to the input of buffer 206 (LF356). Pin 7 of buffer 206 is connected with the positive voltage power supply and with ground through capacitor 280 (0.1 $\mu$F), while pin 4 is connected with the negative voltage power supply and with ground through capacitor 282 (0.1 $\mu$F). The output from buffer 206 is coupled to resistor 283 (1K) of low pass filter 208. Pin 7 of amplifier 210 (LF356) is connected with the positive voltage power supply and with ground through capacitor 284 (0.1 $\mu$F), pin 4 is connected with the negative voltage power supply and with ground through capacitor 286 (0.1 $\mu$F), and pin 3 is connected with the variable tap of potentiometer 288 (0-20K), and output pin 6 is connected with input pin 2 through parallel connected resistor 212 (5K) and capacitor 214 (0.1 $\mu$F).

The averaging integrator 38 of this invention integrates the full wave signal from the synchronous demodulator 36 with the frequency carry-through being similar to a square wave instead of a cosine wave. This makes it much easier to filter out the frequency components in the twice chopper freqency sampled low pass filters included in the averaging integrator. The averaging integrator with its associated twice chopper frequency sampled low pass filters results in a significant improvement in signal to noise ratio. In fact, it has been found that in a working embodiment of this invention, the signal to noise ratio was improved by at least a factor of 2.

The averaging integrator is shown in FIG. 8. As shown, the synchronous demodulated output signal is coupled to switches 292 and 294 with said switches being controlled by a chopping signal coupled thereto from chopping signal generator 296, which may be the sync signal on lead 64. As also shown, the chopping signal coupled to switch 292 is inverted by inverter 298 so that the chopping signal supplied to switch 292 is opposite in phase to that supplied to switch 294. As indicated in FIG. 9, the output signals thus supplied to switches 292 and 294 are opposite phase sine waves and the control signals are square waves ground referenced 180° out of phase with respect to one another and equal in frequency to the input signals. This results in a signal at Point A (FIG. 8) that is a synchronously demodulated sine wave as typically shown in FIG. 9 (referenced as A).

The synchronously demodulated sine wave is coupled to comparator means and more particularly to the noninverting input of amplifiers 300 and 302 with the output of amplifier 300 being coupled through resistor 304 and diode 306 to the negative input of amplifier 300 with the negative input also having charging capacitor 308 connected thereto. In like manner, the output of amplifier 302 is coupled through resistor 310 and diode 312 to the negative input of amplifier 302 with the negative input having charging capacitor 314 connected thereto. The output through diode 306 is connected through resistor 316 to the noninverting input of summing amplifier 318, while the output through diode 312 is coupled through resistor 320 to the noninverting input of summing amplifier 318.

The output of amplifier 300 at Point B (FIG. 8) is normally at −V and goes to the point necessary to cause Point D (at charge capacitor 308 as shown in FIG. 8) to be charged to the highest voltage level of Point A as shown in the typical waveforms of FIG. 10 (In FIG. 10, A is shown as a typically demodulated signal with noise present while in FIG. 9 no noise is represented). The output at Point C (the output of amplifier 302 as shown in FIG. 8) is normally at +V and goes to the point necessary to cause Point E (at charging capacitor 314 as shown in FIG. 8) to be charged to the lowest voltage level of Point A as shown in the typical waveforms of FIG. 10. The duty cycles of Points B and C are determined by the shape of the signal at Point A as again shown by the typical waveforms of FIG. 10.

The frequency of the averaging integrator is set by the values of resistors 316 and 320 and charging capacitors 308 and 314 according to the relationship $1/(2\pi R_{316} C_{308})$. This results in the output of summing amplifier 318 looking like a DC level at point F which is the integral of the signal at Point A as shown by the typical waveforms of FIG. 11. The ripple shown in FIG. 11 at point F is determined by resistors 304 and 310. At Point F, the twice chopper frequency is all that is sampled.

As shown in FIG. 8, the output from the summing amplifier at Point F is coupled through switch 322 and resistor 324 to the negative input of amplifier 326 with the junction of switch 322 and resistor 324 having a capacitor 328 to ground thereat. The output of amplifier 326 (Point H) is coupled back to the negative input through parallel connected resistor 330 and capacitor 332 with the output being coupled from the twice chopper frequency filter through switch 334 to resistor 336 connected with the noninverted input of amplifier 338, the junction of resistor 336 and the noninverted input of amplifier 338 having a capacitor 340 to ground thereat. Switches 332 and 334 are controlled by the output of monostable multivibrator 342 which monostable multivibrator receives the output from frequency doubler 344, which doubler is in turn connected to receive the chopping frequency output from chopping signal generator 296.

As brought out hereinabove, at Point F, the twice chopper frequency component is thus all that is sampled and this creates a narrow band filter which passes only the harmonics of the chopper frequency. This means that at Point G (FIG. 8), a typical waveform is as shown in FIG. 12 and point G is thus the twice chopper frequency sampled version of point F. At the output of amplifier 326 (point H—FIG. 8), the low pass filter version exists with respect to Point G and which filters out the high frequency components of point G. At point J (at switch 344—FIG. 8), the twice chopper frequency sampled version exists with respect to point H, while at Point K (FIG. 8) the low pass filter creates a narrow band pass filter in which the signal passed is only a function of the chopped frequency (as shown in FIG. 13). With respect to the foregoing, the averaging integrator and twice chopper frequency sampled low pass filter as shown can be used after a synchronous demodulator or other applications to improve signal to noise ratio and is not meant to be restricted to the specific embodiment shown hereinabove.

The radiometer is calibrated using black body references as is well known in the art. The radiometer is then self-calibrated thereafter by maintaining the heater in the paddle at a known fixed temperature. This enables assessment of stability and reliability of the radiometer and thus the entire system when utilized for detecting clear air turbulence.

In operation on an airplane for detecting clear air turbulence, the radiometer is positioned to sense incoming radiation ahead of the airplane (typically in the 27 to 33 $\mu$m region) and develop therefrom an analog signal that is representative of the sensed radiation. Since the signal developed will include noise (due to environment and electronic circuitry), enhancement of the signal to noise ratio is provided in this invention by passing the analog signal through processing circuitry that includes active components (which by definition, include components such as integrated circuits which may provide operational units such as operational amplifiers, for example) for filtering the signal and integrating the signal demodulated after filtering. The resulting signal has a superior signal to noise ratio that provides a better indication of clear air turbulence than has heretofore been achieved, thus allowing the airplane to be cautioned and/or diverted as deemed necessary when a clear air turbulance condition is detected ahead of the airplane.

In tests conducted utilizing this invention for actual detection of clear air turbulence, a 94% success rate (and in some instances up to a 98% success rate) was achieved as compared to an 82% success rate for radiometers heretofore known and utilized in the same types of testing. Such testing and results are shown in a Final Statistical Report on Aviation Flight Technology (In-Flight Detection and Prediction of Clear-Air-Turbulence), National Oceanic and Atmospheric Administration, Atmospheric Physics and Chemistry Laboratory, Boulder, Colo. 80303, dated Dec. 1, 1979.

In view of the foregoing, it is apparent that this invention provides an improved radiometer that is particularly useful for detecting clear air turbulence.

What is claimed is:

1. A radiometer apparatus with a high signal to noise ratio useful for detecting disturbances in air by measurement of sensed temperature differences, said apparatus comprising:

signal developing means for receiving temperature indications relating to disturbances in air and providing an electronic signal output indicative thereof; and signal processing means including active filtering and integrating means connected with said signal developing means to receive said electronic signal output therefrom and responsive thereto providing an integrated signal with a high signal to noise ratio whereby said signal processing means provides an output signal having a signal level accurately indicative of temperature differences received by said apparatus, said signal processing means including synchronous demodulator means and said active filtering and integrating means including an averaging integrator integrating said output signal from said synchronous demodulator means, with said averaging integrator including signal chopping means operable at a predetermined frequency, switching means connected with said chopping means and receiving said output signal from said synchronous demodulator means, comparison means connected with said chopping means to receive said output signal therefrom, frequency doubling means connected with said signal chopping means, and sample and hold means connected with said comparison means and said frequency doubling means whereby an output signal is provided from said averaging integrator having a high signal to noise ratio.

2. The apparatus of claim 1 wherein said switching means includes a pair of switches, wherein said chopping means supplies a first signal to one of sid switches and a second signal of opposite phase with respect to said first signal to the other of said switches, and wherein said comparison means includes first and second amplifiers each of which has a charging circuit connected therewith and a third amplifier connected with said first and second amplifiers to receive the outputs therefrom.

3. The apparatus of claim 1 wherein said frequency doubling means includes a frequency doubler and a monostable multivibrator.

4. The apparatus of claim 1 wherein said sample and hold means includes a pair of switches having a filter and amplifier connected therebetween, said switches being connected with said frequency doubling means.

* * * * *